Patented Feb. 13, 1951

2,541,447

UNITED STATES PATENT OFFICE 2,541,447

COMPOSITION FOR ALTERING PHYSIOLOGICAL PROCESSES OF LIVESTOCK AND POULTRY AND PROCESS OF USING SAME

Charles W. Turner and Ezra P. Reineke, Columbia, Mo., assignors to American Dairies Incorporated, Kansas City, Mo., a corporation of Maryland, and The Quaker Oats Company, Chicago, Ill., a corporation of New Jersey No Drawing. Application April 9, 1945,
Serial No. 587,444

19 Claims. (Cl. 99—2)

This invention relates to improvements in altering and controlling certain physiological processes in livestock and poultry by the addition to their ration of selected natural or synthetic estrogen-like chemical compounds known as diethylstilbestrol and its derivatives including its esters and ethers; dihydrostilbestrol (hexestrol), as well as derivatives of the latter; and benzestrol, 2,4 di(parahydroxyphenyl 3-ethyl hexane).

In its broader aspects the invention comprises the addition to the ration of livestock or poultry predetermined critical amounts of any one of several natural or synthetic estrogen-like compounds including diethylstilbestrol or its derivatives, hexestrol, benzestrol, and other natural or synthetic estrogens such as those indicated to accomplish the objectives sought.

There is contemplated also in our invention the incorporation of the hormones and chemicals with salt and/or mineral mixtures of calcium, phosphorus and trace elements or other supplements fed to livestock and poultry in such manner and amount as to be mixed with part or all of the feed concentrate mixture or to be fed as a separate addition to the ration. In such cases the total supplement either separately or when mixed with the feed concentrate mixture should be such as to provide the administration of the hormones and chemicals within the range of daily intake specified in the examples hereinafter set forth.

The favorable physiological effects which may be obtained by adding these materials to the ration in milk producing animals such as cows and goats includes general body growth and the growth of the mammary gland (the udder) and when sufficient secretory tissue has developed, the initiation and maintenance of milk secretion. These favorable effects are obtained by the action which the materials have upon the anterior pituitary hormones influencing growth and other productive processes, as well as upon the genital tissues concerned. Thus, in dairy animals in which normal reproductive processes fail, the addition fo these materials causes the stimulation of the growth of the udder, initiation of and an increase in the commercial quantities of milk produced. In lactating animals controlled use of the materials at intervals during the lactating period tends to maintain and in some cases increase the normal lactation level. The amount or level of oral administration is critical and previous methods of periodic subcutaneous injection or implantation, because of the critical nature of the dosage, have not produced satisfactory effects due to inequality of the level of hormones in the blood. By the oral method the rate of absorption from the gut in poultry and livestock is more uniform. Also, proper use of the material in poultry maintains the appetite of the growing birds and increases the mobilization of blood lipids and their deposition as adipose tissue. It also increases serum calcium, increases the deposition of fat and generally improves the market grade of the birds, as well as the quality of the tissue.

In laying birds the appetite, secretions of the anterior pituitary, and secretions of the oviduct are all stimulated, increasing and maintaining a high rate of egg production besides accelerated mobilization of blood lipids and increasing serum calcium and other physiological processes related to egg production.

In connection with compounds used according to the teachings of our co-pending application Serial No. 501,988, filed September 11, 1943, now Patent No. 2,385,117, issued September 18, 1945, it is contemplated that the estrogen and estrogen-like materials herein disclosed may be used therewith to further stimulate growth, maintain egg production through the favorable action on the appetite exemplified in feed consumption, and the mobilization of blood lipids, calcium, and the action on the secretions of the oviduct associated with egg production.

Likewise these synthetic estrogens may be used to augment or supplement compounds for inhibiting the endocrine function of the thyroid gland in animals and poultry disclosed in our co-pending application Serial No. 513,496, filed December 8, 1943, now Patent No. 2,438,353, issued March 23, 1948. By simultaneous use of these materials the appetite of the fowls and animals is maintained or increased, the metabolism decreased, and the deposition of body fat accelerated to a greater extent than is possible by either method alone.

It is known that the oral effectiveness of synthetic estrogens such as diethylstilbestrol and its derivatives varies to a great extent on the type of digestive system in the animal in which the treatment is practiced. In animals having a simple digestive system some natural estrogens and diethylstilbestrol are effective when administered orally. In ruminant animals and in fowls it has been found that the natural estrogens and diethylstilbestrol are relatively ineffective when given orally so the beneficial effects cannot be economically obtained. It has been discovered that the phenolic hydroxyl groups of diethylstilbestrol when etherified protect the essential structure of the material so when fed to ruminants and birds the material has a much greater physiological activity and effect, therefore it is desirable that these more potent preparations be used when the materials are to be administered to ruminants or fowls. Many esters of diethylstilbestrol such as dipropionate, dibenzoate, or dipalmitate have been prepared, as well as ethers including the mono- and dimethyl or the mono- or diethyl compounds. Of these the dimethyl ether of diethylstilbestrol, in so far as experimental observations have shown, proves to be most effective in birds and ruminants. The effective dosage range for favorable effects will be indicated in terms of the dimethyl ether, although it is not intended to limit the invention solely to the use of this particular material since any estrogen which is orally effective in a given species and at the proper dosage will produce the desired result. As typical examples of the results which were obtained from experiments which have been made upon live animals, the following will indicate the effectiveness of the compounds.

Example I

As a premise for the examples which are to follow it had been observed that a suitable dose of diethylstilbestrol administered subcutaneously resulted in growth of the udder in dairy cows and goats and stimulation of the anterior pituitary to increase lactogenic hormone secretion. If the material was administered in excessive amounts, even established lactation was inhibited. Injection subcutaneously of 0.25 mg. of diethylstilbestrol into 50–100 lb. goats stimulated the growth of the udder and eventual lactation. On the other hand, if 1.0 mg. of diethylstilbestrol is injected daily into 50–100 lb. lactating goats, milk secretion is slightly depressed, 2.0 mg. moderately depressed lactation and 4.0 mg. seriously depressed lactation. In fact after ten days of administration, lactation practically ceased on the latter dose, however, after stopping or greatly reducing the amount injected, milk secretion returned to about the preinjection level or above.

As the effect upon lactation is a good measure of potency of diethylstilbestrol, a comparison was made of the effectiveness of subcutaneous administration as compared with oral administration of the different compounds. By this comparison the administration of diethylstilbestrol orally to the ruminant (dairy goat) is only about 1% as effective as when administered by injection. In other words, where 4.0 mg. of diethylstilbestrol injected subcutaneously will greatly inhibit lactation in ten days of treatment, 400 mg. or more are required to obtain a like effect when given orally. When, however, 100 mg. daily of dimethyl ether of diethylstilbestrol is fed to lactating goats, a decrease in lactation comparable to the effect produced with 400 mg. or more of diethylstilbestrol is obtained, indicating that the dimethyl ether is about four times as effective as the free compound in ruminant animals. To accomplish the desired favorable physiological effects by use of the dimethyl ether compound which is to stimulate the growth of the mammary gland (the udder) in goats from 50 to 100 lbs. body weight, 5 to 50 mg. daily per 100 lbs. body weight was fed in capsules. The preferred method is to add the hormone at the rate of 10 to 100 mg. per kilogram of grain or concentrate mixture to be fed at the rate of about 0.5 kg. per 100 lbs. body weight of animal daily or in other proportions provided the range in total daily intake is the same. When the growth of the udder had been stimulated and milk secretion initiated the amount of the dimethyl ether compound was reduced to about one-half, fed separately or as a constituent of the grain feed for stimulation and maintenance of lactation.

It should be noted that amounts of the hormone in this and the following examples less than the specified dosage range will be harmless so that in practice only maximum amounts need be considered critical. However, amounts near or below the minimum specified have been observed to have diminishing favorable effects.

For dairy cows weighing 1000 lbs. it was necessary to feed 50 to 500 mg. daily to stimulate the growth of the cow's udder. As a component part of the feed this compound was added at the rte of 10 to 100 mg. per kg. of the grain concentrate mixture fed at the rate of about 5 kg. per day or in other proportions provided the range in total daily intake is the same. When the dairy animals were stimulated to maximum milk production the dimethyl ether in the feed was reduced about one-half for continued stimulation and for maintenance of lactation. Tests were made with diethylstilbestrol and its derivatives used as a supplement with artificial thyroprotein produced according to co-pending applications previously referred to. The diethylstilbestrol compounds were employed to stimulate the total growth of the udder while the artificial thyroprotein was used to augment the rate of growth as a result of the favorable effects of thyroxine on growth processes. For goats weighing 50 to 150 lbs. body weight from 5 to 50 mg. of the dimethyl ether compound were administered daily per 100 lbs. body weight. Supplementing this there was administered protamone or an iodinated thyroprotein of standard potency containing 3% thyroxine and this latter compound was administered in amounts ranging from 0.3 to 2 gm., a typical dosage of the combined materials being 10 to 100 mg. of the first compound and 0.6 to 4 gms. of the latter per kg. of the grain concentrate mixture and fed at the rate of about 0.5 kg. per 100 lbs. body weight daily or in other proportions provided the range in total daily intake is the same. When growth of the udder of the cow was stimulated and milk secretion initiated, the amount of the dimethyl ether compound was reduced about one-half administered either separately or as a component part of the grain concentrate mixture, while the feeding of protamone in the grain concentrate mixture continued at the original level.

For dairy cows weighing 1000 lbs. (and for other weights proportionately) it is recommended to feed from 50 to 500 mg. daily of dimethyl ether of diethylstilbestrol plus 5 to 15 gms. of protamone daily to obtain the desired stimulation both of the cow's growth and udder growth. These compounds are preferably added as a component part of the grain concentrate mixture at the rate of 10 to 100 mg. of the dimethyl ether of diethylstilbestrol and 1 to 3 gms. of the protamone per kg. of grain concentrate mixture fed at the rate of 5 kg. per day or in other proportions provided the range in total daily intake is the same.

*Example II*

The administration of diethylstilbestrol by injection or by implantation of pellets has been found effective in suitable amounts for stimulating the appetite and growth rate, in acting upon the secondary sex tissues such as the oviduct, and upon the character of producing increases in the blood lipids and calcium as well as the deposition of body fat characteristic of sexual maturity. However, huge doses of this chemical compound were required when administered orally to fowls.

The range of dosage indicated in the following examples are given in terms of the total growing, fattening or egg laying feed mixtures. If it is desirable to feed the food composition described herewith as a part of the total ration or as a supplement to the ration the amounts of active substance added would be increased in proportion to the ratio which the feed composition containing the specified ingredients bears to the total feed consumption, thus providing the same range in total daily intake of the critical substances.

When dimethyl ether diethylstilbestrol was fed to young chickens at the rate of 1 gm. per 10 kg. (or 0.1 gm. per kg.) of complete feed or at the level of 0.01% of the total starting ration, the weight of the oviduct was increased four times, body weight was increased, and the thyrotropic hormone of the anterior pituitary was significantly increased. At the same time the deposition of fat on the carcass was very pronounced. Tests of various kinds indicate that the dimethyl ether compound is from six to ten times as effective when administered orally to fowls as the free compound. To accomplish the favorable physiological effects of diethylstilbestrol in fowls, the dimethyl ether of diethylstilbestrol is added to the complete poultry food at the rate of 0.5 to 4 gm. per 10 kg. of feed, (or 0.05 to 0.4 gm. per kg.), or at the rate of 0.005% to 0.04% of the feed. Optimum results appear at about the level of 0.01% of the feed for the most rapid growth, feed consumption and rapid fattening. During the period of growth best results are obtained by adding the dimethyl ether compound to the complete ration at the rate of 0.5 to 4 gm. per 10 kg. of feed (or 0.05 to 0.4 gm. per kg.), plus protamone or an iodinated protein of standard potency at the rate of .9 to 10 gms. per 10 kg. of feed or at the rate of 0.005% to 0.04% of the former and 0.009% to 0.10% of the latter with respect to the total ration. In place of protamone any thyroxine or thyroglobulin containing preparation with equivalent thyroxine potency may be substituted. The amount of thyroxine would comprise from 0.0003% to 0.003% of the food consumed by the growing bird.

In laying hens the dimethyl ether compound is fed at the rate of 0.05 gm. to 0.4 gm. per kg. (or 0.005% to 0.04%) of feed to maintain the appetite, increase the blood lipids and have the other favorable influences noted. By feeding the dimethyl ether compound at the rate of 0.05 gm. to 0.4 gm. per kg. of feed to maintain uniformity of its favorable effect upon egg production, plus protamone (containing 3% thyroxine) at the rate of 0.9 to 4 gms. per 10 kg. of feed (or 0.09 to 0.4 gm. per kg.) simultaneously, the beneficial effects of each constituent are additive and increase the benefit of each substance fed alone.

From the above it will be observed that to a complete laying feed should be added 0.005% to 0.04% of the dimethyl ether compound and 0.009% to 0.04% of protamone containing 3% of thyroxine. In place of protamone, thyroxine or thyroglobulin containing preparation with equivalent potency may be substituted at the rate of 0.0003% to 0.0012% of the feed consumed.

*Example III*

In the fattening of fowls of any age, but especially in the case of broilers the most rapid fattening effect has been obtained by the combined use of the dimethyl ether compound at the level suggested in Example II, and thiouracil or thiourea in amounts suggested in our previous application or any other anti-thyroid or goitrogenic drug in amounts sufficient to produce an equivalent suppression of the thyroid secretion.

In practice there are several variations in the feed procedure which will favorably influence the rate of growth and the final quality of the carcass.

1. During the growth period the dimethyl ether compound should be added to the complete ration at the rate of 0.5 to 4 gms. per 10 kg. of feed, then during the fattening period of variable duration add 0.1 gm. to 1.5 gm. of thiouracil, thiourea or related compounds per 10 kg. of feed.

2. During the growing period the dimethyl ether of diethylstilbestrol is added to the growing ration at the rate of 0.5 to 4 gms. per 10 kg. of feed plus protamone (containing 3% of thyroxine) at the rate of 0.9 to 10 gms. per 10 kg. of feed or thyroxine in equivalent amount. Then during the fattening period of variable duration add 0.1 gm. to 1.5 gm. of thiouracil, thiourea or related compounds per 10 kg. of feed and omit the protamone or thyroxine.

3. During the growing period the dimethyl ether compound should be added to the growing ration at the rate of 0.5 to 4 gm. per 10 kg. of feed plus protamone (containing 3% thyroxine) at the rate of 0.9 gm. to 10 gms. per 10 kg. of feed or thyroxine in equivalent amounts. Then during the fattening period remove the protamone or thyroxine but continue the dimethyl ether compound.

*Example IV*

For all livestock, meat and fur animals including rabbits, foxes, experimental animals, swine, horses, etc. having simple stomachs, estrogen and the simple compounds of diethylstilbestrol, hexestrol, or benzestrol have been found more effective than the derivatives mentioned. With such a variety of effective products and with so many varied species of animals, the dosage range can be given only in general terms. In terms of diethylstilbestrol, the amount to be added to the total daily ration per 100 lbs. body weight will vary from 0.1 to 2 mg.; of hexestrol from 0.2 to 3 mg.; and of benzestrol from 0.5 mg. to 5.0 mg.

The amounts of the various derivatives which will give, when administered orally, an equivalent physiological response for the desired function may be substituted.

In the feeding of estrogenic compounds such as diethylstilbestrol and derivatives thereof it should be noted that less than the minimum indicated is harmless to the animals or poultry and that the maximum chosen in each case is the critical amount which should be closely governed and controlled.

Having thus described our invention, we claim:

1. A composition for stimulating the growth of the mammary glands and secretion of lactogenic hormone of the anterior pituitary to initiate and maintain milk secretion in livestock comprising a day's normal concentrate grain ration to which has been added 5 mg. to 50 mg. of dimethyl ether of diethylstilbestrol for each 100 lbs. of the animal's weight.

2. A procedure for stimulating the growth of mammary glands of grown cattle or livestock of similar size consisting of administering 50 mg. to 500 mg. of dimethyl ether of diethylstilbestrol and 5 gm. to 15 gm. protamone having 3% thyroxine potency per 1000 lbs. of body weight daily.

3. A procedure as in claim 2 wherein there is substituted for the dimethyl ether of diethylstilbestrol a synthetic estrogen of equal physiological activity selected from the class consisting of diethylstilbestrol, esters of diethylstilbestrol, hexestrol, ethers of hexestrol, esters of hexestrol, benzestrol, ethers of benzestrol, and esters of benzestrol.

4. A procedure for stimulating the secretion of the lactogenic hormone of the anterior pituitary and the initiation and maintenance of milk secretion in grown cattle or livestock of similar size comprising administering 25 mg. to 250 mg. of dimethyl ether of diethylstilbestrol and 5 gm. to 15 gm. protamone having 3% thyroxine potency per 1000 lbs. body weight daily.

5. A procedure as in claim 4 in which there is substituted for the dimethyl ether of diethylstilbestrol a synthetic estrogen of equal physiological activity selected from the class consisting of diethylstilbestrol, esters of diethylstilbestrol, hexestrol, ethers of hexestrol, esters of hexestrol, benzestrol, ethers of benzestrol, and esters of benzestrol.

6. A composition for improving the feed consumption and growth rate of poultry consisting of a normal feed ration to each kg. of which has been added 0.05 gm. to 0.4 gm. of dimethyl ether of diethylstilbestrol and 0.09 gm. to 1.0 gm. protamone containing 3% thyroxine.

7. A composition as in claim 6 in which there is substituted for the dimethyl ether of diethylstilbestrol a synthetic estrogen of equal physiological activity selected from the class consisting of diethylstilbestrol, esters of diethylstilbestrol, hexestrol, ethers of hexestrol, esters of hexestrol, benzestrol, ethers of benzestrol, and esters of benzestrol.

8. A composition for improving the feed consumption and growth rate of poultry consisting of a normal feed ration to each kg. of which has been added 0.05 gm. to 0.4 gm. of dimethyl ether of diethylstilbestrol and 0.0025% to 0.2% of compounds of the group of thiourea and thiouracil.

9. A composition for increasing and maintaining egg production and market grade of poultry, consisting of a normal feed ration to which has been added 0.005% to 0.04% of dimethyl ether of diethylstilbestrol and 0.009% to 0.04% of protamone containing 3% of thyroxine.

10. A composition as in claim 9 in which there is substituted for the dimethyl ether of diethylstilbestrol a synthetic estrogen which will produce equal physiological activity selected from the class consisting of diethylstilbestrol, esters of diethylstilbestrol, hexestrol, ethers of hexestrol, esters of hexestrol, benzestrol, ethers of benzestrol, and esters of benzestrol.

11. A dosage procedure for stimulating the growth of mammary glands and the secretion of lactogenic hormone of the anterior pituitary in livestock comprising the steps of adding to a normal concentrate grain ration 0.001% to 0.01% of dimethyl ether of diethylstilbestrol, and feeding the mixture at the daily rate of 0.5 kg. of said mixture per 100 lbs. of body weight of the animal.

12. A procedure as in claim 11 wherein there is substituted for the dimethyl ether of diethylstilbestrol a synthetic estrogen of equal physiological activity selected from the class consisting of diethylstilbestrol, esters of diethylstilbestrol, hexestrol, ethers of hexestrol, esters of hexestrol, benzestrol, ethers of benzestrol and esters of benzestrol.

13. A dosage procedure for stimulating the secretion of lactogenic hormone of the anterior pituitary and maintaining milk secretion in livestock comprising the steps of adding to a normal concentrate grain ration 0.0005% to 0.005% of dimethyl ether of diethylstilbestrol, and feeding the mixture at the daily rate of 0.5 kg. per 100 lbs. body weight of the animal.

14. A procedure as in claim 13 wherein there is substituted for the dimethyl ether of diethylstilbestrol a synthetic estrogen of equal physiological activity selected from the class consisting of diethylstilbestrol, esters of diethylstilbestrol, hexestrol, ethers of hexestrol, esters of hexestrol, benzestrol, ethers of benzestrol and esters of benzestrol.

15. A dosage procedure for stimulating the secretion of lactogenic hormone of the anterior pituitary and maintaining milk secretion in livestock, comprising the steps of adding to the normal concentrate grain ration 0.001% to 0.01% of dimethyl ether of diethylstilbestrol and 0.06% to 0.4% of protamone having 3% thyroxine potency, and feeding the mixture at the daily rate of 0.5 kg. per 100 lbs. body weight of the animal.

16. A dosage procedure for stimulating the growth of mammary glands and the secretion of estrogenic hormone of the anterior pituitary to initiate and maintain milk secretion in livestock, comprising the steps of adding to a normal concentrate grain ration 0.0005% to 0.005% of dimethyl ether of diethylstilbestrol and 0.06% to 0.4% of protomone containing 3% thyroxine, and feeding the mixture at the daily rate of 0.5 kg. per 100 lbs. body weight of the animal.

17. A procedure for stimulating and maintaining milk secretion in lactating animals comprising the steps of orally administering dimethyl ether of diethylstilbestrol at the daily rate of 5 to 50 mg. per 100 lbs. of the animal's body weight until maximum milk production is achieved, and thereafter orally administering dimethyl ether of diethylstilbestrol at the daily rate of 2.5 to 25 mg. per 100 lbs. of the animal's body weight.

18. A procedure as in claim 17 wherein there is substituted for the dimethyl ether of diethylstilbestrol a synthetic estrogen of equal physiological activity selected from the group consisting of diethylstilbestrol, esters of diethylstilbestrol, hexestrol, ethers of hexestrol, esters of hexestrol, benzestrol, ethers of benzestrol and esters of benzestrol.

19. A procedure as in claim 17 including the additional step of administering protamone containing 3% thyroxine at the daily rate of 0.3 to 2 gm. per 100 lbs. of the animal's body weight.

CHARLES W. TURNER.
EZRA P. REINEKE.

REFERENCES CITED

The following references are of record in the file of this patent:

"Poultry Science," Jan. 1945, vol. XXIV, No. 1, published by the Official Journal of Poultry Science Assn., pages 91 and 92.

"Poultry Science," May 1944, vol. XXIII, No. 3, pages 249 to 251.

"Manufacturing Chemist and Manufacturing Perfumer," June 1943.

"The Extra Pharmacopoeia" by Martindale, volume I, 22nd edition, 1941, pages 725 to 728.

Merck Index, 1940, page 196.